US012619420B2

(12) United States Patent
Katoh et al.

(10) Patent No.: US 12,619,420 B2
(45) Date of Patent: May 5, 2026

(54) ELECTRONIC CONTROL UNIT

(71) Applicant: TOYOTA JIDOSHA KABUSHIKI KAISHA, Toyota (JP)

(72) Inventors: Masanori Katoh, Okazaki (JP);
Kazuyoshi Shiohara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 18/493,971

(22) Filed: Oct. 25, 2023

(65) Prior Publication Data

US 2024/0211239 A1      Jun. 27, 2024

(30) Foreign Application Priority Data

Dec. 23, 2022    (JP) ................................. 2022-206718

(51) Int. Cl.
*G06F 8/65*          (2018.01)
*B60R 16/023*        (2006.01)

(52) U.S. Cl.
CPC ............ *G06F 8/65* (2013.01); *B60R 16/0231* (2013.01)

(58) Field of Classification Search
CPC ......... B60R 16/0231; B60R 1/04; G06F 8/65; H04W 4/024; H04W 4/40; H04W 4/50
See application file for complete search history.

(56) References Cited

U.S. PATENT DOCUMENTS

2010/0262971 A1* 10/2010 Yamada .................. G06F 9/505
                                                      718/104
2015/0377204 A1* 12/2015 Koyama ............. B60R 16/0239
                                                      701/113

2017/0060559 A1* 3/2017 Ye .............................. G06F 8/65
2017/0148415 A1    5/2017 Ogura
2018/0181124 A1* 6/2018 Fukuda ................. G06F 11/302
                              (Continued)

FOREIGN PATENT DOCUMENTS

JP          2016-091257 A     5/2016
JP           2022-66959 A     5/2022

OTHER PUBLICATIONS

Herberth, Roland, et al. "Automated scheduling for optimal parallelization to reduce the duration of vehicle software updates." IEEE Transactions on Vehicular Technology 68.3 (2019): 2921-2933. Retrieved from the Internet: <https://ieeexplore.ieee.org/stamp/stamp.jsp?tp=&arnumber=8626041> (Year: 2019).*

(Continued)

*Primary Examiner* — S. Sough

*Assistant Examiner* — Cheneca Smith

(74) *Attorney, Agent, or Firm* — Oliff PLC

(57)                    ABSTRACT

An electronic control unit includes a first processing unit and a second processing unit. Each of the first processing unit and the second processing unit includes a processor and a rewritable storage device. Each of the first processing unit and the second processing unit is configured to perform a service by the processor executing software stored in the rewritable storage device. The electronic control unit is configured to set, during a period other than a first period during which all services performed by the first processing unit are suspendable, a second period during which all services performed by the second processing unit are suspendable.

6 Claims, 3 Drawing Sheets

(56) References Cited

U.S. PATENT DOCUMENTS

2022/0342702 A1* 10/2022 Drory .................. G06F 9/4881

OTHER PUBLICATIONS

Onuma, Yutaka, et al. "A method of ECU software updating." 2018 International Conference on Information Networking (ICOIN). IEEE, 2018. Retrieved from the Internet: <https://ieeexplore.ieee.org/stamp/stamp.jsp?tp=&arnumber=8343129> (Year: 2018).*

* cited by examiner

FIG. 1

ELECTRONIC CONTROL UNIT

CROSS-REFERENCE TO RELATED APPLICATION

This application claims priority to Japanese Patent Application No. 2022-206718 filed on Dec. 23, 2022, incorporated herein by reference in its entirety.

BACKGROUND

1. Technical Field

The disclosure relates to an electronic control unit.

2. Description of Related Art

Vehicles are equipped with a plurality of electronic control units. In recent years, integration of electronic control units has progressed, and the number of types of services assigned to each electronic control unit has increased. Further, in recent years, over-the-air (OTA) technology for updating software of electronic control units by distributing update data through wireless communication has come into practical use, as described in Japanese Unexamined Patent Application Publication No. 2022-66959 (JP 2022-66959 A).

SUMMARY

There are cases in which restarting of the electronic control unit is required in order to complete updating of the software of the electronic control unit. Electronic control units that perform various types of services perform some sort of services while the vehicle is traveling or while the vehicle is parked, and accordingly there are cases in which completion of updating of the software is delayed due to not being able to obtain an opportunity to restart.

An electronic control unit according to a first aspect of the present disclosure has a first processing unit and a second processing unit. Each of the first processing unit and the second processing unit includes a processor and a rewritable storage device. Each of the first processing unit and the second processing unit is configured to perform a service by the processor executing software stored in the rewritable storage device. The electronic control unit is configured to set, during a period other than a first period during which all services performed by the first processing unit are suspendable, a second period during which all services performed by the second processing unit are suspendable.

Even in a situation in which the electronic control unit as a whole continues to execute some sort of service, each of the first processing unit and the second processing unit have a period in which all services are suspendable. Accordingly, both the first processing unit and the second processing unit are more likely to have an opportunity to restart in order to complete updating of the software. Thus, the electronic control unit described above has an advantage in that updating of software can be completed without delay, even in electronic control units that perform a wide variety of services.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram schematically illustrating a configuration of an embodiment of an electronic control unit;

DETAILED DESCRIPTION OF EMBODIMENTS

Figure 1:
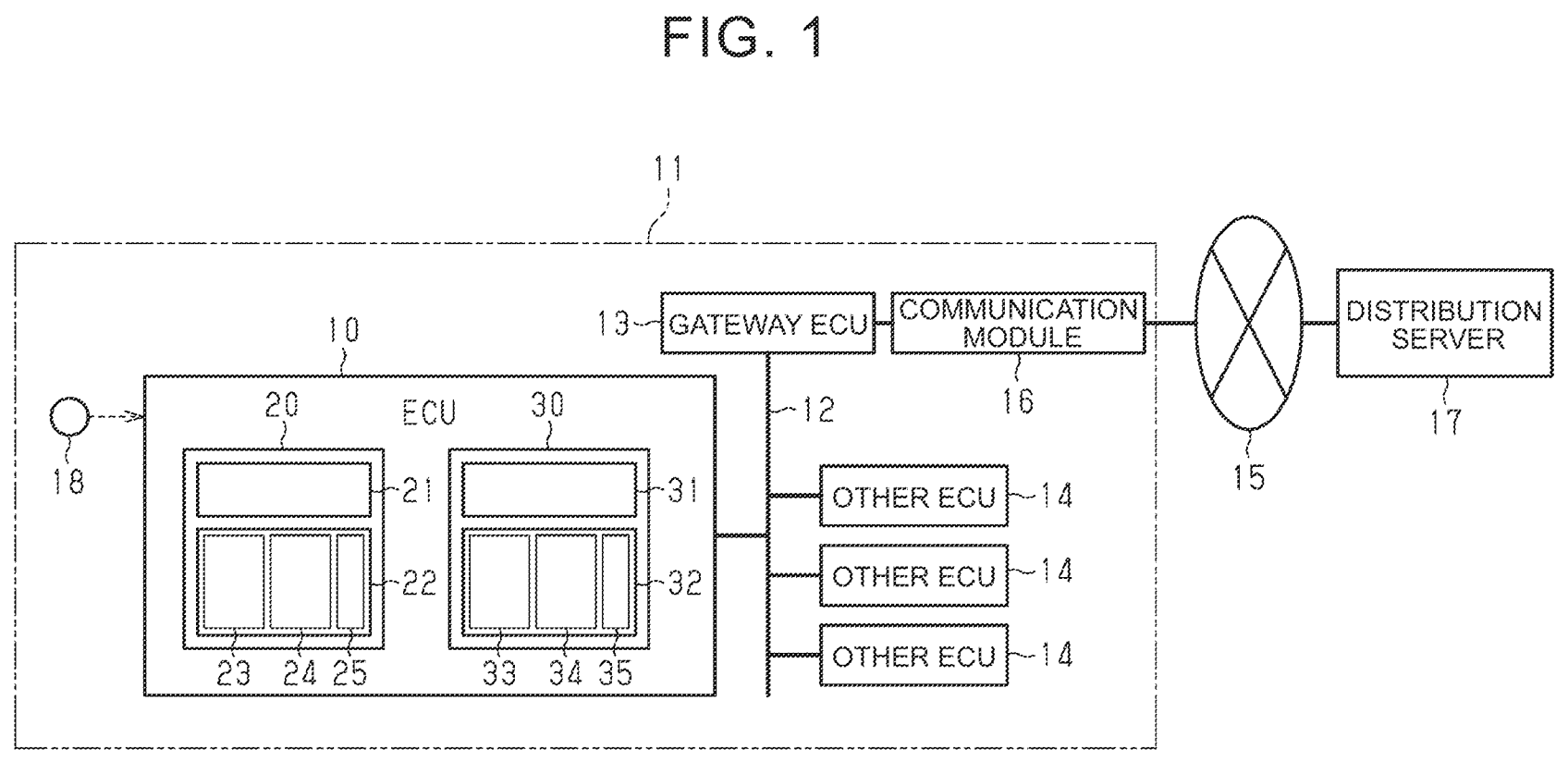
Figure 2:
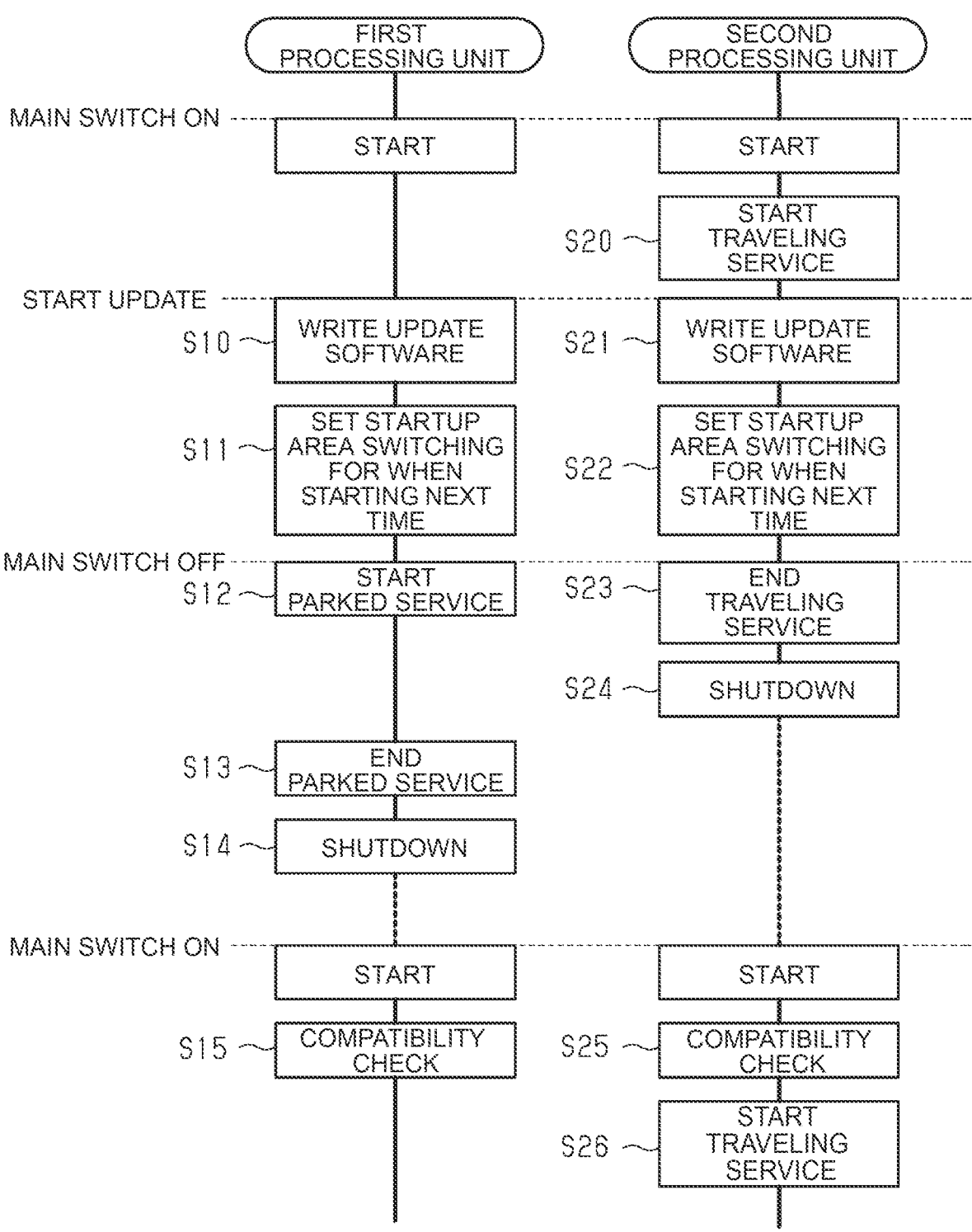
FIG. 2 is a sequence diagram showing an example of procedures for updating software in the same electronic control unit.

An embodiment of an electronic control unit will be described in detail below with reference to FIGS. 1 to 3.

Configuration of Electronic Control Unit

First, a configuration of the electronic control unit according to the present embodiment will be described with reference to FIG. 1. In the following description, the term "electronic control unit" will be abbreviated to "ECU". An ECU 10 according to the present embodiment makes up an advanced driver-assistance system (ADAS) of a vehicle 11. The ECU 10 is connected to an in-vehicle communication network 12. A plurality of ECUs other than the ECU 10 is installed in the vehicle 11. An example of such an ECU is a gateway ECU 13 that controls communication among ECUs via the in-vehicle communication network 12. In addition, the vehicle 11 is equipped with a plurality of ECUs 14 such as an ECU for engine control, an ECU for transmission control, and so forth.

A communication module 16 for wireless communication is connected to the gateway ECU 13. The communication module 16 performs wireless communication externally from the vehicle via a wireless communication network 15. A distribution server 17 that distributes update data for software of the ECU 10 is connected to the wireless communication network 15.

The ECU 10 has a first processing unit 20 and a second processing unit 30. The first processing unit 20 is a microcontroller that has a processor 21 and memory 22. The first processing unit 20 executes services by causing the processor 21 to execute programs stored in the memory 22. The memory 22 is a rewritable storage device such as flash memory. The memory 22 has a first storage area 23, a second storage area 24 and a third storage area 25. Both the first storage area 23 and the second storage area 24 are storage areas for storing software for services carried out by the ECU 10. The third storage area 25 is a storage area that stores software for updating software. On the other hand, the second processing unit 30 is a microcontroller unit having a processor 31 and memory 32, in the same way as the first processing unit 20. The memory 32 of the second processing unit 30 includes a first storage area 33, a second storage area 34, and a third storage area 35, in the same way as the memory 22 of the first processing unit 20. In the case of the ECU 10 according to the present embodiment, the first processing unit 20 and the second processing unit 30 are each configured as a system on a chip (SoC), in which functional components such as the processors 21 and 31, the memories 22 and 32, and so forth, are respectively mounted on a single semiconductor chip.

The first processing unit 20 executes services that are performed by the ECU 10 during a period in which a main switch 18 of the vehicle 11 is off. Examples of services executed by the first processing unit 20 include a vehicle exiting assistance service and a parking monitoring service. The vehicle exiting assistance service is a service in which a warning or the like is given to an occupant when another vehicle passing near the vehicle 11 is detected when the occupant is exiting the vehicle. An execution period of the vehicle exiting assistance service is a period from when the main switch 18 is turned off until doors of the vehicle 11 are locked. The parking monitoring service is a service for monitoring the vehicle 11 that is parked, using a dashboard camera or the like. An execution period of the parking monitoring service is a period from when the main switch 18 is turned off until the doors of the vehicle 11 are unlocked. Note that whether to execute the parking monitoring service is a user-selectable option. On the other hand, the second processing unit 30 executes services that are performed by the ECU 10 during a period in which the main switch 18 of the vehicle 11 is on. Examples of services executed by the second processing unit 30 include a safety assistance service and an advanced driver-assistance service. The safety assistance service includes a service that performs warning and brake assistance when there is a possibility of collision with a vehicle traveling ahead or the like, and a service that presents images of the surroundings of the vehicle 11 to the occupants. The advanced driver-assistance service includes services such as adaptive cruise control, in which the vehicle travels at a constant speed while maintaining distances as to other vehicles, steering assistance for lane centering, and steering and braking assistance for collision avoidance, and so forth. An execution period of the safety assistance service and the advanced driver-assistance service is a period during which the main switch 18 is turned on.

In the following description, services performed by the first processing unit 20 during a period in which the main switch 18 is off will be referred to as "parked services". Also, services performed by the second processing unit 30 during a period in which the main switch 18 is on will be referred to as "traveling services". A period during which the parked services can be suspended is a period during which the main switch 18 is on. On the other hand, a period during which the traveling services can be suspended is a period during which the main switch 18 is off. In this way, the ECU 10 is configured to have a period during which all the services performed by the second processing unit 30 can be suspended, during a period other than the period during which all the services performed by the first processing unit 20 can be suspended.

The first processing unit 20 and the second processing unit 30 operate as follows when updating of software is not being performed. The second processing unit 30 is started in response to an operation of turning the main switch 18 on. Following this starting, the second processing unit 30 starts the traveling services. Thereafter, when an operation of turning the main switch 18 off is performed, the second processing unit 30 ends the traveling services and thereafter instructs its own shutdown and stops running. On the other hand, the first processing unit 20 is also started in response to locking of the doors of the vehicle 11. After starting, the first processing unit 20 carries out the parked services until the main switch 18 is turned on. Thereafter, when the main switch 18 is turned off, the first processing unit 20 resumes the parked services. When the parked services are completed, the first processing unit 20 then instructs its own shutdown and stops running. Note that there are situations in which the doors are unlocked before the parked services are completed, in order for an occupant to re-enter the vehicle. Also, when the parking monitoring service is carried out, this service continues until the main switch 18 is turned on.

In these cases, the first processing unit 20 is running when the doors are unlocked, and continues to run thereafter.

Updating Software

The ECU 10 supports software updating through wireless communication. When updating software, the ECU 10 acquires software update data from the distribution server 17 via the wireless communication network 15. The ECU 10 then updates the software stored in the respective memory 22 and 32 of the first processing unit 20 and the second processing unit 30, based on the update data that is acquired.

The first processing unit 20 and the second processing unit 30 are configured to be capable of updating software while executing software. The first processing unit 20 and the second processing unit 30 perform services by the processors 21 and 31 executing software stored in one of the first storage areas 23 and 33 and the second storage areas 24 and 34. In the following description, out of the first storage areas 23 and 33 and the second storage areas 24 and 34, the storage areas that store the software to be executed by the processors 21 and 31 will be referred to as "startup area", and the other storage areas as "standby area". While software stored in the startup area is being executed, the first processing unit 20 and the second processing unit 30 write software to be updated to the standby area. When the writing is completed, the first processing unit 20 and the second processing unit 30 update the software by switching the startup area and the standby area when the start is performed the next time.

In the case of the ECU 10 according to the present embodiment, such updating processing of software is performed by the processors 21 and 31 reading and executing software stored in the third storage areas 25 and 35. A processing unit for updating software may be installed in the ECU 10, separately from the first processing unit 20 and the second processing unit 30, with this processing unit performing the processing of updating the software. Alternatively, another ECU that is separate from the ECU 10, such as the gateway ECU 13 for example, may perform processing for updating the software of the ECU 10.

FIG. 2 shows an example of procedures for updating software in the ECU 10. FIG. 2 shows a case in which software of both the first processing unit 20 and the second processing unit 30 is updated. Note that FIGS. 2 and 3 assume that the unlocking of the doors and the operation of turning the main switch 18 on are performed at the same time.

In the case in FIG. 2, when the main switch 18 is turned on and the first processing unit 20 and the second processing unit 30 are started, updating of software is started. Upon the updating starting, the first processing unit 20 and the second processing unit 30 write the update software to the standby areas of the memories 22 and 32 (S10, S21). Upon the writing being completed, the first processing unit 20 and the second processing unit 30 set switching of startup areas to be performed at the time of starting the next time (S11, S22). Note that the second processing unit 30 starts the traveling services before starting the update (S20). Accordingly, the second processing unit 30 executes writing of the update software (S21) in parallel with the traveling services.

Thereafter, when an operation is performed to turn the main switch 18 off, the second processing unit 30 ends the traveling services (S23), and then stops running (S24). On the other hand, the first processing unit 20 starts the parked services in response to the operation of turning the main switch 18 off (S12). After ending the parked services (S13), the first processing unit 20 stops running (S14).

Thereafter, the first processing unit 20 and the second processing unit 30 are started in a state in which the storage areas, to which the update software was written, are switched to startup areas, in accordance with the settings made in S11 and S22. After starting, the first processing unit 20 and the second processing unit 30 carry out a compatibility check of the software that is updated (S15, S25). In the compatibility check, confirmation is made regarding whether the updated software conforms to the vehicle 11, based on information such as the version of the software and so forth. Once the compatibility check is passed, updating of the software is complete. The second processing unit 30 starts the traveling services after the compatibility check (S26). Note that when the compatibility check is not passed, the first processing unit 20 and the second processing unit 30 restore the startup areas to the original state and restart themselves.

Figure 3:
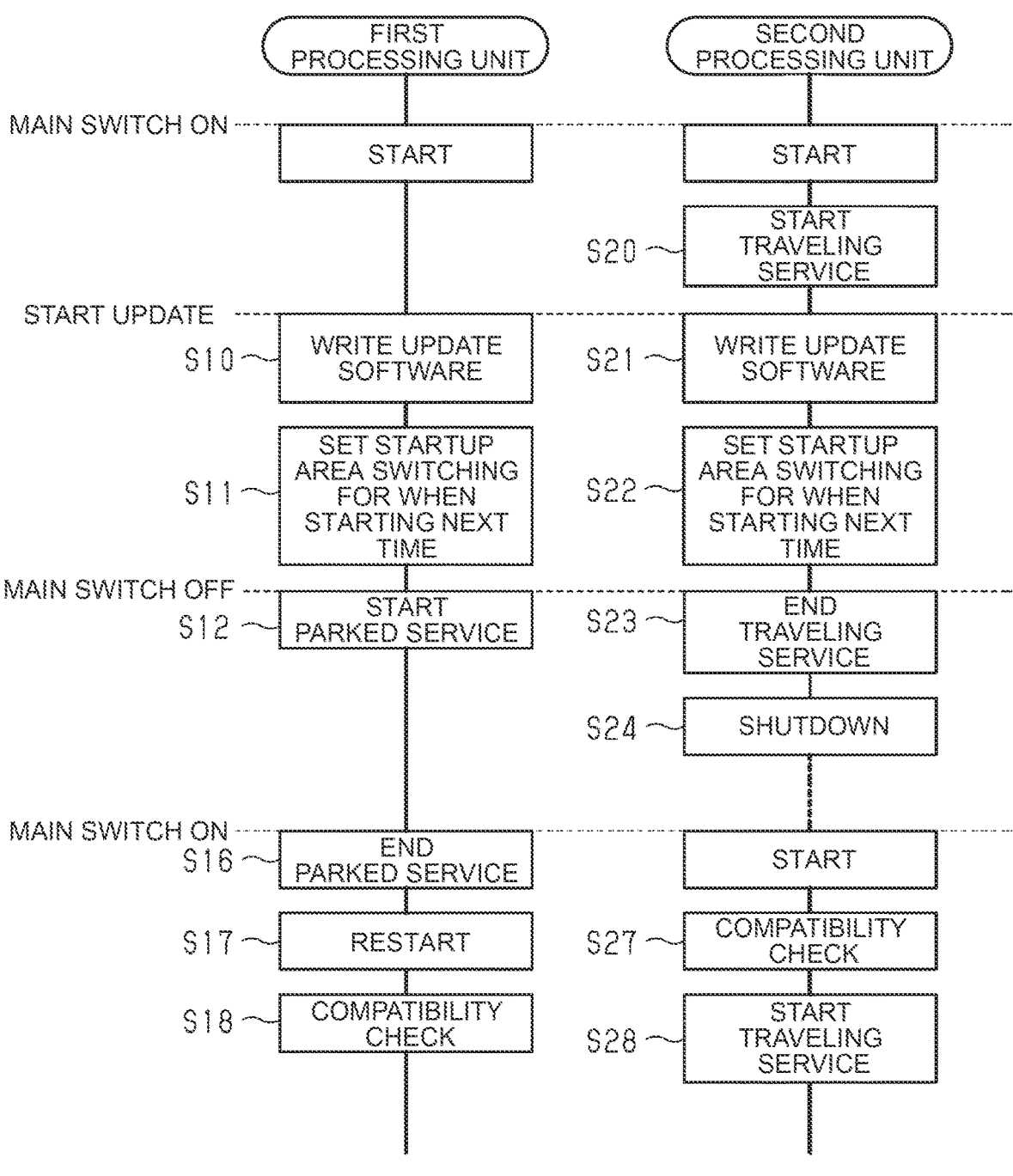
FIG. 3 is a sequence diagram showing another example of the procedures for updating software in the same electronic control unit.

FIG. 3 shows another example of the procedures for updating software in the ECU 10. Upon completing the parked services while the main switch 18 is off, the first processing unit 20 instructs its own shutdown and stops running. However, there are cases in which the occupant re-enters the vehicle and performs an operation to turn on the main switch 18 before the parked services are completed. Also, when performing the parking monitoring service, the parked services are continued until an operation is performed to turn the main switch 18 on. FIG. 3 shows procedures for updating software for when the parked services continue until an operation is performed to turn the main switch 18 on.

In the case in FIG. 3 as well, updating of the software of the second processing unit 30 is performed following the same procedures as in the case in FIG. 2. On the other hand, the first processing unit 20 in the case in FIG. 3 continues the parked services, which were started in response to the operation of turning off the main switch 18 after writing of the update software is completed, until an operation of turning the main switch 18 on is performed thereafter. When the main switch 18 is turned on, the first processing unit 20 ends the parked services (S16), and then restarts itself (S17). Switching of the startup area to the storage area in which the update software is written is performed at the time of this restarting. After restarting, the first processing unit 20 then carries out a compatibility check (S18) and completes updating of the software.

Advantageous Effects of Embodiment

The ECU 10 executes the traveling services in periods during which the main switch 18 is on, and the parked services in periods during which the main switch 18 is off, respectively. The parked services may continue until an operation is performed to turn the main switch 18 on. Also, the software of the ECU 10 is updated by switching the startup areas of the memories 22 and 32. The switching of the startup area is performed when the processing units having the memories 22 and 32 are restarted.

A configuration in which such an ECU 10 is realized by a single microcontroller unit (hereinafter referred to as "MCU") will be considered. The MCU in this case executes both the traveling services and the parked services. Accordingly, when the parked services are continued until an operation is performed to turn the main switch 18 on, restarting of the MCU cannot be carried out to complete updating of the software.

In contrast, the ECU 10 according to the present embodiment has two MCUs, i.e., the first processing unit 20 and the second processing unit 30. The parked services are performed by the first processing unit 20, and the traveling services are performed by the second processing unit 30, respectively. The parked services are services that are performed during a period in which the main switch 18 of the vehicle 11 is off. The traveling services are services that are performed during a period in which the main switch 18 of the vehicle 11 is on. Accordingly, the first processing unit 20 has a period during which all services can be suspended during a period in which the main switch 18 is on. Also, the second processing unit 30 has a period during which all services can be suspended during a period in which the main switch 18 is off.

In such an ECU 10, the second processing unit 30 can be shut down during a period in which the main switch 18 is off. Also, even when the parked services are performed until the main switch 18 is turned on, the first processing unit 20 can be shut down after the main switch 18 is turned on. Accordingly, updating of the software of the ECU 10 can be completed during two trips, regardless of the status of the parked services being carried out.

The present embodiment exhibits the following advantages.

(1) The ECU 10 has the first processing unit 20 and the second processing unit 30. The functions of the ECU 10 are shared between the first processing unit 20 and the second processing unit 30, so that the parked services are performed by the first processing unit 20 and the traveling services are performed by the second processing unit 30. Accordingly, even in a situation in which the ECU 10 as a whole continues to execute some sort of service, each of the first processing unit 20 and the second processing unit 30 have an opportunity to carry out restarting for software updating. Thus, according to the present embodiment, the completion of software updating is less likely to be delayed, even in the ECU 10 that performs various types of services.

(2) When the parked services end before an operation is performed to turn the main switch 18 on, the first processing unit 20 stops running of itself after this ending. Also, when the parked services are continued until an operation is performed to turn the main switch 18 on, the first processing unit 20 carries out restarting of itself after the operation is performed to turn the main switch 18 on. Thus, once the writing of the update software is completed, the updating of the software of the first processing unit 20 can be completed after an operation of turning the main switch 18 on is performed the next time.

Other Embodiments

The present embodiment can be carried out modified as follows. The present embodiment and the following modifications can be carried out in combination as long as no technical contradiction arises.

The software update may be performed by a method other than switching the startup areas of the memories 22 and 32. For example, the software may be updated by writing update software to the memories 22 and 32 while the first processing unit 20 and the second processing unit 30 are stopped.

In the above-described embodiment, the services of the ECU 10 are assigned so that the first processing unit 20 performs the parked services, and the second processing unit 30 performs the traveling services. Assignment of services to the first processing unit 20 and the second processing unit 30 may be performed so as to satisfy the following conditions. The conditions are that there is a period during which all the services performed by the second processing unit 30 can be suspended, during a period other than the period during which all the services performed by the first processing unit 20 can be suspended. In such a case, even in a situation in which the ECU 10 as a whole continues to execute some sort of service, each of the first processing unit 20 and the second processing unit 30 will have an opportunity to restart, in order to complete updating of the software.

The configuration of the ECU 10 according to the embodiment described above can also be applied to other ECUs, such as an ECU for engine control, an ECU for transmission control, and so forth, as long as the ECU is an ECU in which software is updated.

What is claimed is:

1. An electronic control unit comprising:

a first processing unit;

including a first processor and a first rewritable storage device, and being configured to perform a first service by executing first software stored in the first rewritable storage device; and a second processing unit;

including a second processor and a second rewritable storage device, being configured to perform a second service by executing second software stored in the second rewritable storage device, wherein the electronic control unit is configured to:

suspend all services executed by the first processing unit, during a first period, suspend all services executed by the second processing unit during a second period, different from the first period, restart the first processing unit to complete updating of the first software during the first period, and shutdown the second processing unit during the second period and restart the second processing unit to complete updating of the second software during the first period.

2. The electronic control unit according to claim 1, wherein:

the electronic control unit is installed in a vehicle;

the first period exists when a main switch of the vehicle is on; and the second period exists when the main switch is off.

3. The electronic control unit according to claim 1, wherein:

the electronic control unit is installed in a vehicle;

the first processing unit is configured to perform the first service during the second period; and the second processing unit is configured to perform the second service during the first period.

4. The electronic control unit according to claim 1, wherein:

the first rewriteable storage device includes a first storage area and a second storage area for storing the first software before updating and the first software after updating, respectively, the second rewriteable storage device includes a third storage area and a fourth storage area for storing the second software before updating and the second software after updating, respectively, updating of the first software is performed by switching from reading the first storage area to the second storage area, and updating the second software is performed by switching from reading the third storage area to the fourth storage area.

5. The electronic control unit according to claim 1, wherein the electronic control unit is configured to complete updating of both the first software and the second software within two power cycles of a main switch of a vehicle.

6. The electronic control unit according to claim 1, wherein the first service comprises at least one of a parking monitoring service or a vehicle exit assistance service, and the second service comprises at least one of a safety assistance service or an advanced driver-assistance service.

* * * * *